(12) United States Patent
Carey

(10) Patent No.: US 12,523,998 B2
(45) Date of Patent: Jan. 13, 2026

(54) SYSTEM AND METHOD FOR PERFORMING ANALYSES AND AUTOMATION WITHIN DIGITAL SYSTEMS

(71) Applicant: The Toronto-Dominion Bank, Toronto (CA)

(72) Inventor: John Francis Carey, Whtiby (CA)

(73) Assignee: The Toronto-Dominion Bank, Toronto (CA)

( * ) Notice: Subject to any disclaimer, the term of this patent is extended or adjusted under 35 U.S.C. 154(b) by 376 days.

(21) Appl. No.: 18/318,759

(22) Filed: May 17, 2023

(65) Prior Publication Data

US 2024/0385609 A1    Nov. 21, 2024

(51) Int. Cl.
*G05B 23/02*    (2006.01)

(52) U.S. Cl.
CPC .................... *G05B 23/0218* (2013.01)

(58) Field of Classification Search
CPC ............ G05B 23/0218; G06F 11/3006; G06F 21/554; G06F 21/6218; G06F 11/3051
See application file for complete search history.

(56) References Cited

U.S. PATENT DOCUMENTS

| | | |
|---|---|---|
| 7,774,363 B2 | 8/2010 | Lim |
| 7,886,041 B2 | 2/2011 | Outhred et al. |
| 8,417,678 B2 | 4/2013 | Bone et al. |
| 8,418,124 B2 | 4/2013 | Turner et al. |
| 9,430,257 B2 | 8/2016 | Zaslavsky et al. |
| 9,497,223 B2 | 11/2016 | Kulaga et al. |
| 9,563,771 B2 | 2/2017 | Lang et al. |
| 9,772,830 B2 | 9/2017 | Balasubramanian |
| 10,185,827 B1 * | 1/2019 | Hamlin ................... G06F 21/57 |
| 10,715,637 B2 * | 7/2020 | Erdelyi ................... H04L 67/06 |
| 10,749,886 B1 | 8/2020 | Kandel et al. |
| 10,853,311 B1 * | 12/2020 | Hayes ..................... G06F 16/11 |
| 11,411,966 B2 * | 8/2022 | Muddu ............... G06F 16/9024 |
| 11,748,487 B2 * | 9/2023 | Ranjan ............... G06F 11/3698 726/25 |
| 11,749,081 B2 * | 9/2023 | Rutter .................... G08B 17/10 340/628 |
| 12,259,978 B2 * | 3/2025 | Pizlo ...................... G06F 21/52 |

(Continued)

Primary Examiner — Debbie M Le
(74) Attorney, Agent, or Firm — CPST Intellectual Property Inc.; Brett J. Slaney

(57) ABSTRACT

A device, method, and computer readable medium for automating processes in digital environments. Illustratively, the method includes providing an instruction to implement at least one operation on a target computing platform. The method includes executing one or more commands to search for one or more locations of the target computing platform to determine a target property. The one or more commands search based on at least one pre-configured parameter of a plurality of pre-configured parameters for searching computing platforms. The method includes determining (e.g., using machine learning) at least one automated command to execute based on the determined target property of the target computing platform and the at least one operation. The at least one automated command is selected from an automated command repository for detecting anomalies in digital environments. The method includes executing the determined at least one automated command to detect anomalies.

20 Claims, 5 Drawing Sheets

(56) References Cited

U.S. PATENT DOCUMENTS

| | | | |
|---|---|---|---|
| 2012/0102485 A1* | 4/2012 | Goldman | G06F 9/44526 717/176 |
| 2019/0324743 A1 | 10/2019 | Sajadi | |
| 2022/0129551 A1 | 4/2022 | Collier et al. | |
| 2024/0160436 A1* | 5/2024 | Imms | G06F 8/71 |

* cited by examiner

SYSTEM AND METHOD FOR PERFORMING ANALYSES AND AUTOMATION WITHIN DIGITAL SYSTEMS

TECHNICAL FIELD

The following relates generally to automating operations within digital systems, and, in particular, to automating operations based on a target property of a computing platform.

BACKGROUND

Existing digital environments are increasingly complex. The complexity can result in operations within the environments requiring costly knowhow, difficulty in scaling the knowhow, etc. In addition, the costs associated with maintaining the complex digital environments are large, as it is more difficult to document the complexity, to implement changes without impacting other components, and/or to maintain and retain talent capable of interacting with these systems as they age.

The digital environments can also be underpinned by a variety of computing hardware, with different access regimes (e.g., local, or remote access).

As a result of the complex environments, the automation systems that interact with these digital environments suffer from similar shortcomings (they are similarly complex, hard to maintain, etc.). The complexity in a large organization only exacerbates the complications associated with managing complex computer architecture, as it becomes difficult for evaluation systems to be comprehensive, robust, inexpensive, and accessible to other than specialists.

Reducing the burden of implementing evaluation and automation approaches for complex systems, whether that burden is administrative, monetary, resource based (e.g., computing resources), or expertise, etc., is desirable.

BRIEF DESCRIPTION OF THE DRAWINGS

Embodiments will now be described with reference to the appended drawings wherein.

DETAILED DESCRIPTION

Figure 1:
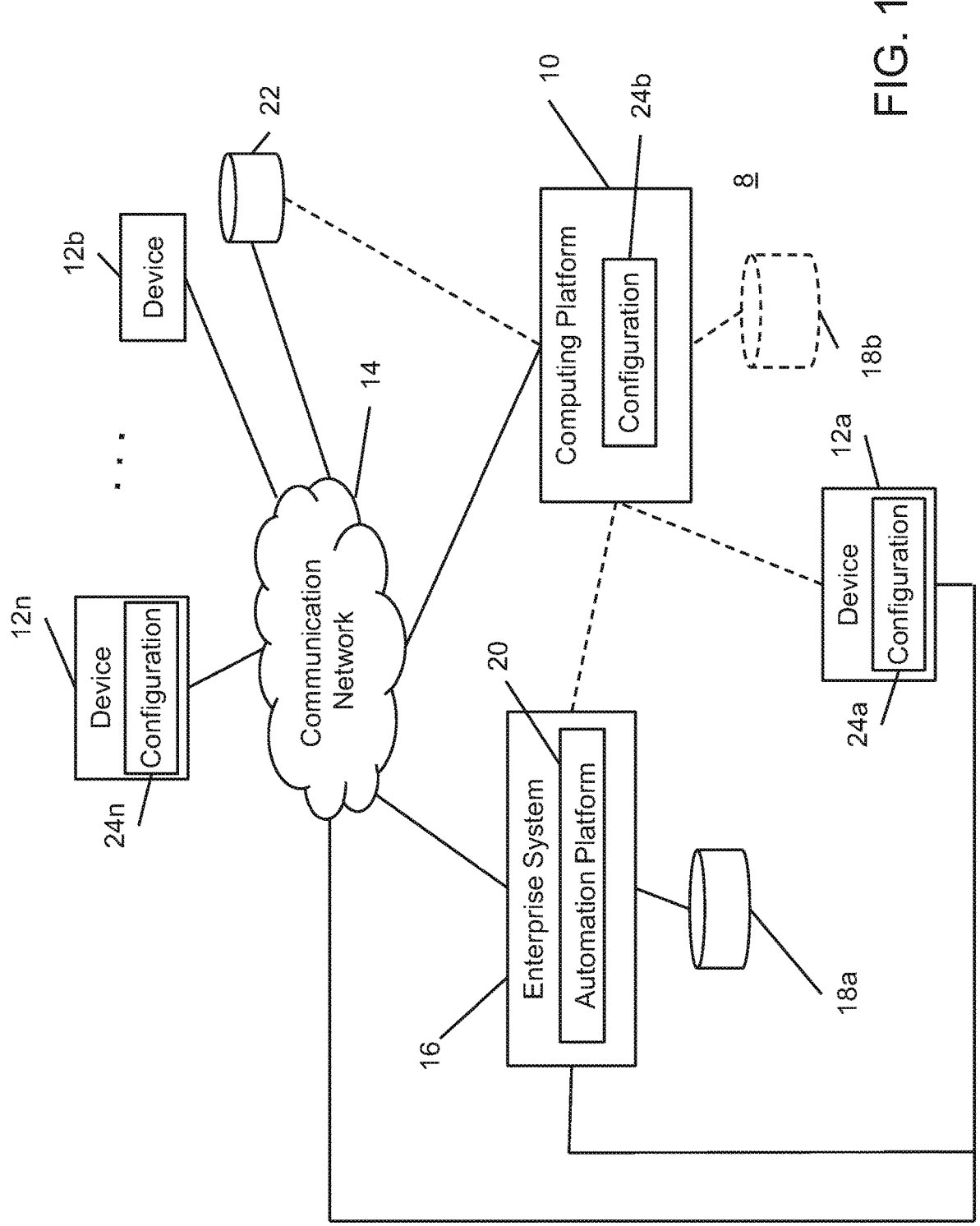
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It is understood that the use of the term "data file," also referred to as a "data element" is not intended to be limited solely to individual data files, and that an expansive definition of the term is intended unless specified otherwise. For example, the data file can store information in different formats, can be stored on different media (e.g., a database, a portable data stick, etc.). The data file may not necessarily be an independent file, and can be part of a data file, or include a routine, method, process, workflow, object, etc.

The following relates to automated evaluation processes for digital systems. An approach is for an automation platform to execute one or more commands to search for a target property of a target computing platform, where that target property is a configuration that determines whether and which type of automated commands can be implemented. The search is defined in part by one or more pre-configured parameters, such as naming conventions, file structures, etc. The targeted search capitalizes on computer program design increasingly adopting principles to hard-code locations of important properties in program binaries. For example, an operating system is likely to store a location of configuration parameters (i.e., target properties) relevant to which operations can be performed on the operating system in its binary file. As a result, opportunities to increase automation are present that have not been available historically. Systematically searching a target platform to identify a vector (e.g., the binary) to the target property (e.g., the configuration file) can enable robust automation approaches. The automation approaches can apply to situations that are previously unencountered and allow for rapid proliferation of automation in a controlled manner. For example, the search commands can use a threshold of similarity to identify a target property or related vector even in new computing platforms (e.g., previously unencountered build of an operating system).

The automation platform can be used to perform security audits, enact security policies, etc. The automation platform may also be able to quickly scale across existing complex systems without the number of resources previously required. For example, a mapping of the target property to available automated commands from an automated command repository can be used to cover a broad range of applications with reduced effort. In addition, the amount of knowhow required to maintain the system is reduced because of centralization of automation and detection of systems. Maintenance can also be simplified, as a roll-out of changes can be controlled with changes to automated commands.

In one aspect a device for automating processes in digital environments is disclosed. The device includes a processor, a communications module coupled to the processor, and a memory coupled to the processor. The memory stores computer executable instructions that when executed by the processor cause the processor to provide an instruction to implement at least one operation on a target computing platform. The instructions cause the processor to execute one or more commands to search for one or more locations of the target computing platform to determine a target property. The one or more commands search is based on at least one pre-configured parameter of a plurality of pre-configured parameters for searching computing platforms. The instructions cause the processor to determine at least one automated command to execute based on the determined target property of the target computing platform and the at least one operation. The at least one automated command is selected from an automated command repository for detecting anomalies in digital environments. The instructions cause the processor to execute the determined at least one automated command to detect anomalies.

In example embodiments, the at least one pre-configured parameter is an expected binary property of either a device associated with the target computing platform or a virtually instantiated platform. The expected binary property can be a name of a binary. The expected binary property can be updated in response to the one or more commands finding a name in an expected location that satisfies a threshold of similarity to the name.

In example embodiments, the plurality of pre-configured parameters for searching computing platforms include parameters of naming conventions associated with different computing platforms.

In example embodiments, the instructions cause the processor to execute another of the one or more commands to perform another search with another of the at least one pre-configured parameters in response to the search being unsuccessful.

In example embodiments, the target property is an ability of a computing platform to implement the at least one automated command as defined by a configuration file associated with a binary file.

In example embodiments, the instructions further cause the processor to determine the one or more command functions based on a provided property.

In example embodiments, the instructions further cause the processor to, in response to failing to find the target property in the location, searching through another location to determine the target property. The one or more commands can be updated for subsequent use to search the other location in response to finding the target property in the other location.

In example embodiments, the at least one automated command includes performing a security audit on an application based on the target property.

In another aspect a method for automating processes in digital environments is disclosed. The method includes providing an instruction to implement at least one operation on a target computing platform. The method includes executing one or more commands to search for one or more locations of the target computing platform to determine a target property. The one or more commands search based on at least one pre-configured parameter of a plurality of pre-configured parameters for searching computing platforms. The method includes determining at least one automated command to execute based on the determined target property of the target computing platform and the at least one operation. The at least one automated command is selected from an automated command repository for detecting anomalies in digital environments. The method includes executing the determined at least one automated command to detect anomalies.

In example embodiments, the at least one pre-configured parameter is an expected binary property of either a device associated with the target computing platform or a virtually instantiated platform. The expected binary property can be a name of a binary. The expected binary property can be updated in response to the one or more commands finding a name in an expected location that satisfies a threshold of similarity to the name.

In example embodiments, the method includes executing another of the one or more commands to perform another search with another of the at least one pre-configured parameters in response to the search being unsuccessful.

In example embodiments, the method includes determining the one or more command functions based on a provided property.

In example embodiments, the method includes, in response to failing to find the target property in the location, searching through another location to determine the target property.

In example embodiments, the at least one automated command includes performing a security audit on an application based on the target property.

In another aspect, a non-transitory computer readable medium (CRM) for automating processes in digital environments is disclosed. The CRM includes computer executable instructions for performing any one of the methods discussed in the other aspect.

Referring now to the figures, FIG. 1 illustrates an example of a computing environment 8. The computing environment 8, as shown, includes a computing platform 10, one or more client devices 12 (shown by client devices 12a, 12b . . . 12n, hereinafter referred to in the singular for ease of reference), a source of data (optionally), such as the shown datastore 18, and a communications network 14 connecting one or more components of the computing environment 8.

The computing environment 8 can also include an enterprise system 16 (e.g., a financial institution such as commercial bank and/or insurance provider) that provides services to users (e.g., processes financial transactions) which generate, come into possession of, or require the enterprise system 16 be responsible for the storage of, data elements, such as sensitive data. Similarly, the enterprise system 49 can generate, come into possession of, or be responsible for storing, maintaining, and providing, various processes. Collectively, the stored data and/or processes, and related data or processes, may be referred to herein as data elements.

The enterprise system 16 generates, stores, maintains, and/or provides at least one process, or at least one data element, via the computing platform 10. At least some of the aforementioned data elements are stored, maintained, or instantiated in the computing platform 10. Data elements required for operations executed by the platform 10 can be stored locally in a datastore 18b, or the platform 10 can be configured to access an enterprise datastore 18a.

The datastore 18 can receive the data elements from other components in the environment 8. For example, the datastore 18 can receive data elements from a device 12, a third-party service provider used by the enterprise system 16, such as the shown cloud computing service provider 22, etc. The datastore 18b can receive the data elements directly, or indirectly (e.g., receive data from device 12a indirectly, via the enterprise system 16).

As alluded to above, the datastore 18 can include at least some sensitive data. The sensitive data can include team, intranet, messaging, committee, or other client- or relationship-based data. The sensitive data can be data that is not controlled by certain processes within an enterprise system 16, or otherwise (e.g., enterprise system 16 generated data). For example, the sensitive data can include information about third party applications (relative to enterprise system 16) used by employees, such as human resources, information technology (IT), payroll, finance, or other specific applications. The sensitive data in the datastore 18 may include data associated with a user of a client device 12 that interacts with the computing platform 10, and/or the enterprise system 16 (e.g., an employee, or other user associated with an organization associated with the enterprise system 16, or a customer, etc.). The sensitive data can include customer data associated with a client device 12, and can include, for example, and without limitation, financial data, transactional data, personally identifiable information, data related to personal identification, demographic data (e.g., age, gender, income, location, etc.), preference data input by the client, and inferred data generated through machine learning, modeling, pattern matching, or other automated techniques. In at least one example embodiment, the sensitive data includes any data provided to a financial institution which is intended to be confidential, whether the data is provided by a client, employee, contractor, regulator, etc. The sensitive data in the datastore 18 may include historical interactions and transactions associated with the computing platform 10 and/or enterprise system 16, e.g., login history, search history, communication logs, documents, etc.

The data associated with a user can include data that may be mapped to corresponding data from sources other than the interaction with the enterprise system 16 or the computing platform 10. The sensitive data can, for example, also include any additional data from a source external to the computing environment 8, for example, social media, publicly accessible repositories or other sources for which permission and access to such data is implied or consented to by the user.

As indicated above, the datastore 18 can be a datastore 18 that is not managed by the enterprise system 16. For example, the datastore 18b (and computing platform 10) can be a third party application operated by other than the enterprise system 16. In another example, the datastore 18 is stored within a third-party cloud computing environment, etc.

The enterprise system 16 can include different components, which components have been omitted from FIG. 1 for clarity. Some of the potential components are discussed in FIG. 3, below, with additional detail.

The computing platform 10 is used to perform at least one operation for the enterprise system 16. The platform 10 can, for example, be responsible for processing transactions for the enterprise system 16, for storing data elements for the enterprise system 16, etc.

The enterprise system 16 includes an automation platform 20 for evaluating computing platforms 10 (or other platforms of the enterprise system 16). The automation platform 20 can perform, for example, security analyses on data elements of the enterprise system 16. The automation platform 20 can evaluate various data elements (e.g., processes, data, settings, etc.), have access to various different data or tools to perform the analysis, etc. The computing platform 20 can be provided with access to a remote datastore (e.g., cloud provider 22 datastore), to retrieve parameter(s) used to implement security analysis, or to retrieve security analysis tools, to automate processes therein, etc. In example embodiments, data elements within the environment 8 may automatically be subjected to a security analysis by the automation platform 20 as part of an infrastructure to automate security analyses.

The platform 20 can be updated based on historical operating data, whether by participants of the environment 8, or by other participants. For example, in one contemplated example, the participants in environment 8 are all working on behalf of a bank-owned system 16 or joint venture, and other participants (not shown) from a competitor bank(s) can also add to the platform 20 (e.g., to satisfy certain regulatory requirements). In another example, the platform 20 can be maintained or otherwise configured by proprietors of the platform 20.

Figure 3:
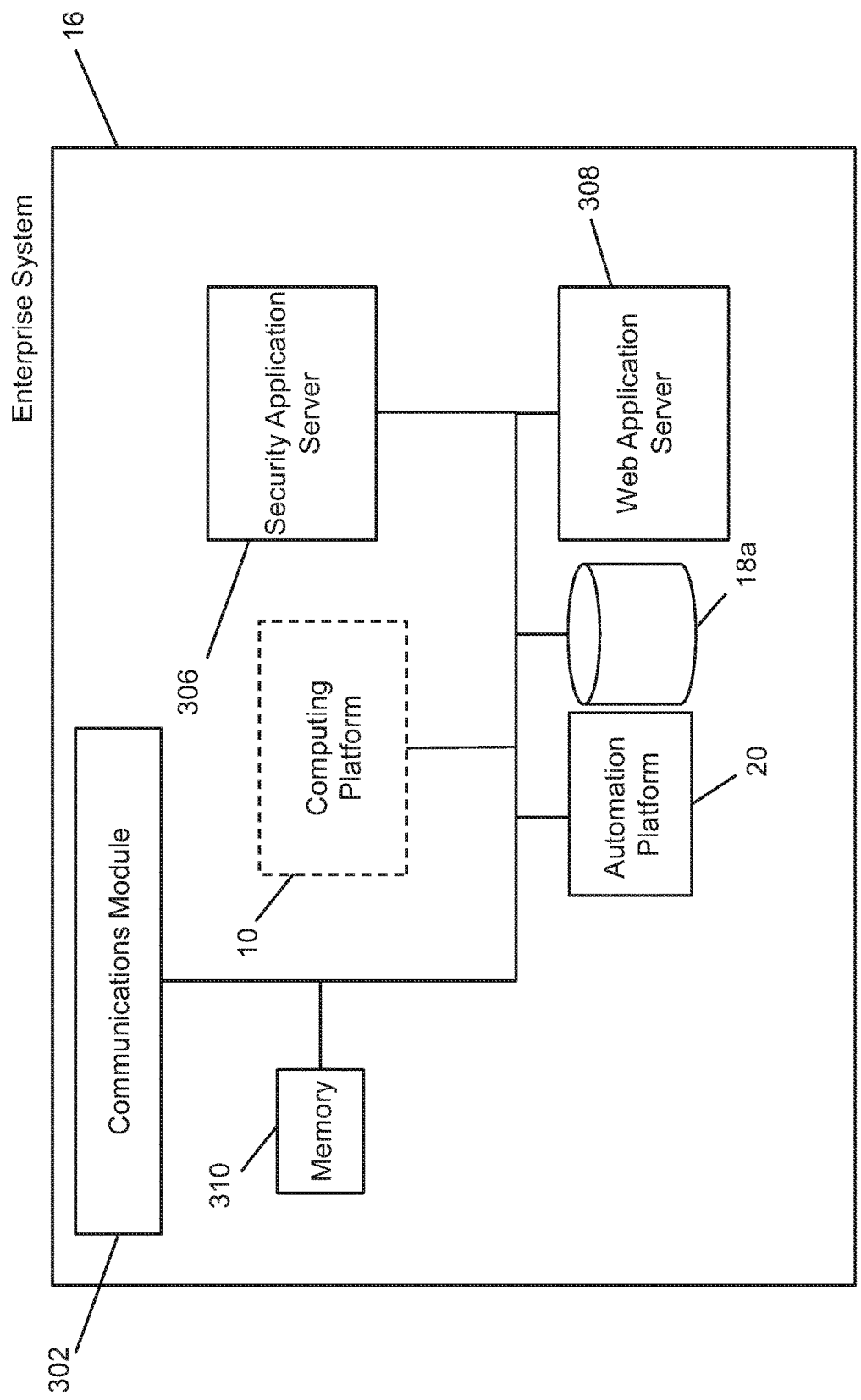
FIG. 3 is a block diagram of an example configuration of an enterprise system.

It can be appreciated that while the computing platform 10 and enterprise system 16 are shown as separate entities in FIG. 1, they may also be part of the same system. For example, the computing platform 10 can be hosted and provided within the enterprise system 16 as illustrated in FIG. 3. Similarly, while the platform 20 and the enterprise system 16 are shown as integrated, the automation platform 20 can be a platform separate from the system 16.

Client device 12 may be associated with one or more users. Users may be referred to herein as employees, customers, clients, consumers, correspondents, or other entities that interact with the enterprise system 16, computing platform 10, and/or automation platform 20 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with the computing platform 10 and/or automation platform 20. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect two or more of the client device 12, enterprise system(s) 16, platform 20, datastores 18, and computing platform(s) 10. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet).

In one embodiment, the automation platform 20 may be one or more programs configured to process and store information, and more generally execute software instructions to perform one or more methods consistent with the disclosed embodiments. In certain embodiments, although not required, automation platform 20 may be associated with one or more divisions within an enterprise. The automation platform 20 may represent or be part of different types of business entity. For example, the automation platform 20 may be a system associated with a commercial bank (e.g., enterprise system 16), a digital media service provider, etc. The automation platform 20 can also operate as a standalone entity that is configured to serve other business entities.

The computing platform 10, automation platform 20, and/or enterprise system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the computing platform 10, automation platform 20, and/or enterprise system 16. The cryptographic server may be used to protect, for example, the sensitive data on the datastore 18 and/or a tool of the platform 20, etc., by way of encryption for data protection, digital signatures or message digests for data integrity, and by using digital certificates to authenticate the identity of the users and client devices 12 with which the enterprise system 16, computing platform 10, and/or automation platform 20, communicates to inhibit data breaches by adversaries. It can be appreciated that various cryptographic mechanisms and protocols can be chosen and implemented to suit the constraints and requirements of the particular deployment of the computing platform 10, automation platform 20, or enterprise system 16 as is known in the art.

The automation platform 20 can perform automations that have at least two components: determining target properties of the platform 10 (or a component of enterprise system 16), and executing at least one automated command on the platform 10 based on the determined target properties.

The target properties 24 (where FIG. 1 illustratively shows this property as a configuration file) are properties that impact the operation of the at least one automated command. For example, the target property 24 can be a configuration file associated with a binary file that can control or impact how, or whether, an automated command can be implemented on the platform 10. In a more particular example, the target property can be a type of hypervisor of a computing platform 10 that is a virtually implemented platform (i.e., the platform 10 is a so-called virtual machine).

The platform 20 includes one or more commands to search the platform 10 to determine the target property 24. The one or more commands can include commands that search a variety of different computing platforms. For example, the one or more commands can include commands that search Windows™ based operating systems to determine the hypervisor of the platform 10 on a virtual machine, commands to determine a configuration file of a Windows™ operating system where the platform 10 is a separate device (e.g., the property 24b of device 12a shown in FIG. 1), etc.

Two example commands that can be executed by the platform 20 are provided below. In a first example, the platform 20 executes an auto-location detection command to determine the location of configuration files associated with a binary of a platform 10. The command can be a Unix command as follows:

```
/usr/bin/strings –n <min_filename_length> <software_binary> | grep <name_of_configuration_file>
  Example command: strings –n11 /usr/sbin/sshd | grep sshd_config
  Output (an example of a location used to find target property 24):
  /etc/ssh/sshd_config
```

In the second example, the platform 20 executes a command to detect a hypervisor. The hypervisor detector command can detect the type of hypervisor that underlies the operating system of the platform 10.

```
Example command: /usr/sbin/dmidecode | egrep –i "manufacture|product"
Output (an example of a target property 24):
Manufacturer: VMware, Inc.
Product Name: VMware7,1
Manufacturer: Intel Corporation
Product Name: 440BX Desktop Reference Platform
Manufacturer: No Enclosure
Manufacturer: GenuineIntel
Manufacturer: GenuineIntel
Manufacturer: VMware Virtual RAM
Manufacturer Name: Intel
```

As shown in the examples, the one or more commands result in the platform 20 determining the target property 24 directly, or indirectly (e.g., determining a vector (binary) to identify the location of the configuration file with the target properties 24).

The one or more commands can be implemented in different ways. The commands can be implemented sequentially, with commands responsive to the platform 10 being a device being implemented first (e.g., commands to search a particular location) to find the target property 24, and commands responsive to alternative software environments being subsequently run for different expected software environments. In example embodiments, two or more of the one or more commands are run simultaneously (to speed up detection). As the examples above indicate, the commands can be responsive to an expected operating environment (e.g., Windows commands, Unix commands, etc.), or in example embodiments the commands can be cycled until the command that interacts with the software environment is determined.

Figure 2:
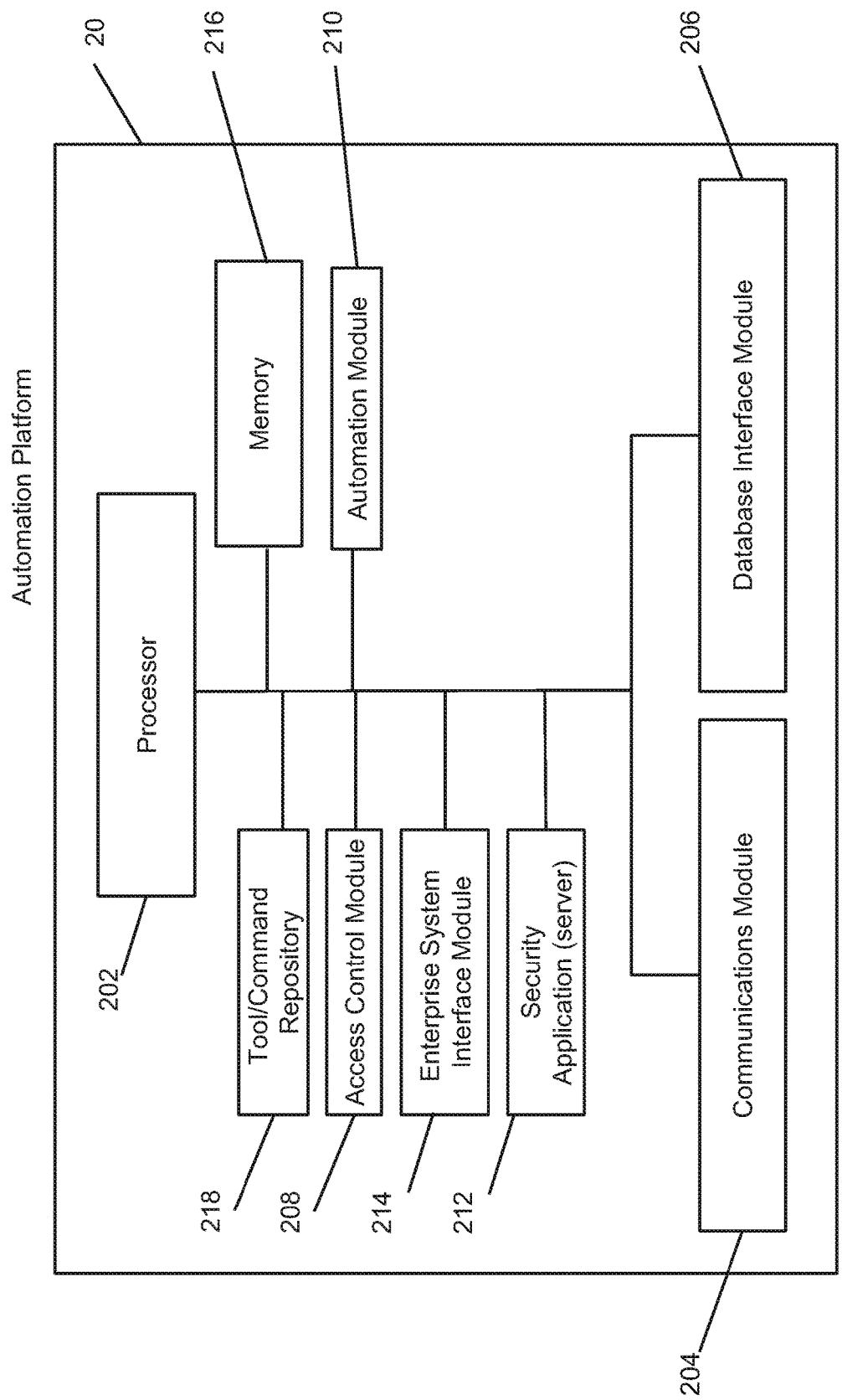
FIG. 2 is a block diagram of an example configuration of a computing platform.

The commands can be based on, incorporate, or rely upon tools from a tool repository 218 (FIG. 2). The commands can rely on tools of the operating system of the platform 10, or custom tools, etc. In at least one example embodiment, the tools include a grep command in Unix to parse a particular log file or binary file to determine the location of a configuration file.

The one or more commands can be based on at least one pre-configured parameter. For example, the at least one pre-configured parameter can be responsive to finding a binary of an operating system (i.e., an expected binary property). Different binary properties can be expected based on whether the platform 10 is operating on a standalone device (e.g., device 12a, with property 24a), or a virtually instantiated platform (e.g., the platform 10 shown in FIG. 1, with property 24a). The expected binary property can be a naming convention (e.g., a minimum name length, a specific string in the name, a combination of strings in the name, etc.), in that the binary file can have a particular name in different operating systems or computing platforms, or a particular extension, or a particular location, etc., or some combination thereof. This is further evidenced by the above shown examples, where a string length, and a particular location are parameters of the command to find the binary and the configuration file.

As alluded to above, the one or more commands can also include parameters to parse a found binary file to determine the target property 24 (e.g., the configuration file properties). That is, the parameters can include the name of an expected configuration file, its name length, how the configuration file is likely to be referenced within a binary, etc.

The one or more commands leverage a change to programming approaches where binary files are increasingly prepared to include the location of the configuration file therein (i.e., the configuration file is in a hard-coded location). As a result, finding the binary file, parsing the binary file to identify the configuration file, and parsing the configuration file therefrom can be used to resolve unknowns about the software operating environment to automate certain operations. Alternatively stated, the configuration file can then be parsed to determine which automated commands can be implemented on the computing platform 10.

The one or more commands can determine target properties 24 in known environments (e.g., there is a parameter responsive to the environment), or unknown environments (e.g., the commands are implemented until a command that is successful in the environment is found). For example, in respect of unknown environments, the one or more commands can include a command to search for a particular name, or a string associated with a name (e.g., a subset of characters of the name). In response to finding a particular file that is responsive to the string associated with a name, the platform 20 can determine whether it satisfies a threshold of similarity to the name which is being search prior to updating the platform 20. The threshold of similarly can be based on the degree to which the name corresponds to the name being searched for (e.g., where only 3 characters of an expected ten (10) character string is matched, the threshold may fail), whether the location of the found file is an expected location, etc.

If the commands successfully navigate an unknown environment, the platform 20 can be updated with a history of the platform 10 for subsequent evaluation. Updating the platform 20 can include updating existing commands, with new pre-configured parameters, or generating a new parameter to enable a new command to navigate the previously unknown environment.

Figure 4:
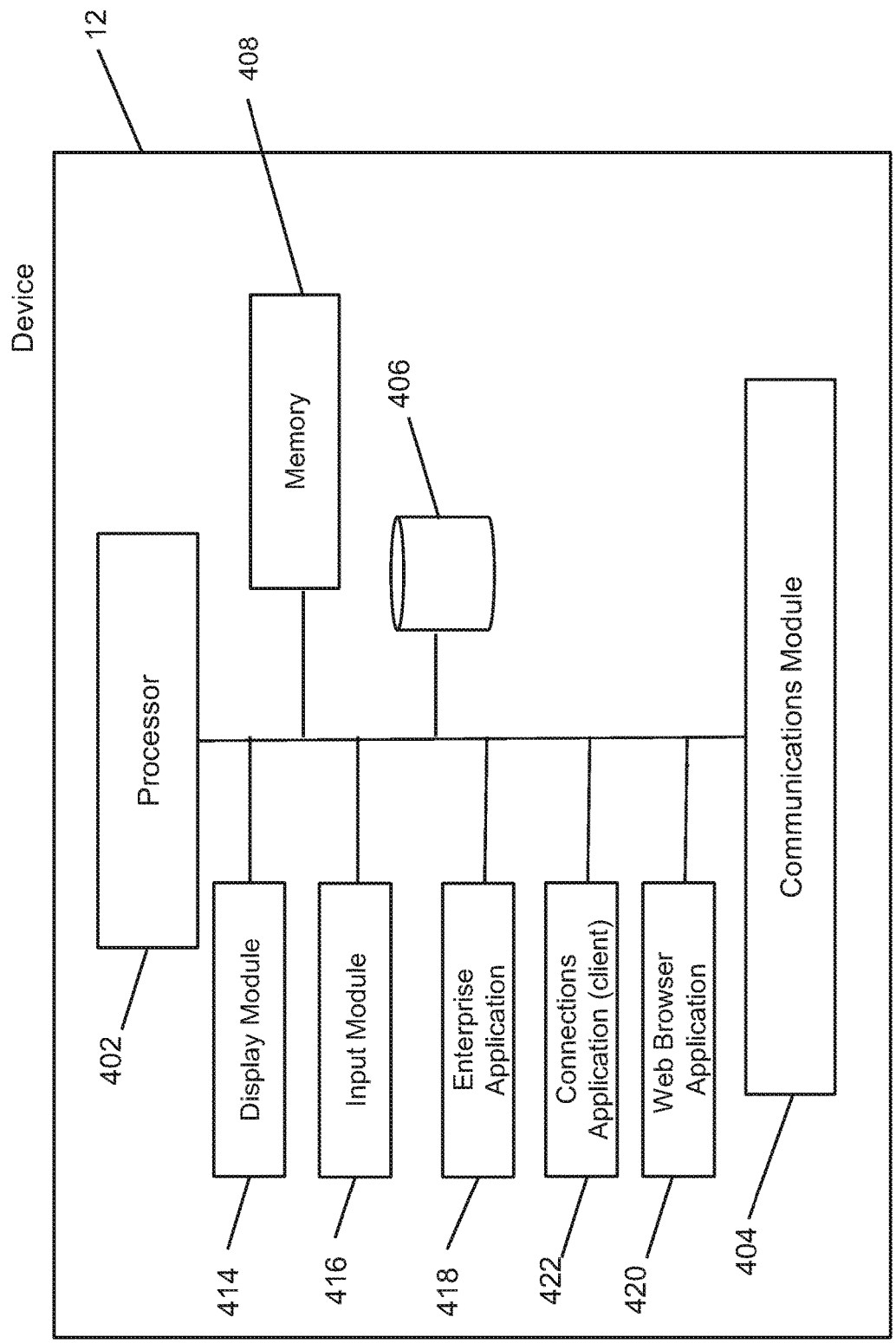
FIG. 4 is a block diagram of an example configuration of a computing device associated with a user, customer, or client.

Once the target property 24 is determined, the platform 20 can implement one or more automated commands related to the target property 24. The automated command(s) can be responsive to provided operations to implement. For example, an interface (e.g., generated by a display module 414 of a device 12, as shown in FIG. 4) can request programmers or laypeople responsible for monitoring or configuring the platform 10 to provide operations to implement. The operations can include, for example, auditing the performance of security features of the platform 10, performing different enterprise system 16 policies, including backup, security, monitoring, central logging policies, etc. Relatedly, the automated commands can be for a variety of applications responsive to the operations. For example, the operation of a security audit can include the automated commands for detecting anomalies in digital environments.

The automated commands implemented can be automated commands from an automated command repository (repository 218 of FIG. 2). The automated command repository can be used to manage the relationships between automated commands, target properties, and provided operations, and even automate certain operations. For example, in response to a provided operation to configure a new platform 10, the repository 218 can be parsed to determine automated commands related to a determined target property 24, which can include the installation of certain applications, the implementation of security policies on the new platform 10, etc. Similarly, certain automated commands of the repository 218 can be implemented automatically (e.g., periodically). For example, the automated command to perform a security audit can be conducted once a month, at a particular time, etc.

The platform 20 can be configured to learn from previous instances of interactions with unknown environments. For example, the platform 20 can update an automated command repository (e.g., repository 218 of FIG. 2) to link a newly encountered target property 24 with a particular automated command. For example, the build version of the particular target computing platform 10 can be unknown. The platform 20, because of the one or more commands searching for and finding the target property 24 (e.g., the new build uses the same location for the operating system binary, or uses the same name for the OS binary, etc.) in the new build, can associate that new build with one or more automated actions in the automated command repository. The associations can be based on the commands that successfully navigated the new build, or based on associations of the target property 24 which can be associated with the successful command, etc. The platform 20 can perform an automated command audit, where it can attempt various automated commands and see which commands are successful to develop a conceptual map of the new build. As a result, new environments can be automatically included in the platform 20 capability, without the requirement for additional programming.

Relatedly, the platform 20 can be updated without the number of resources that would otherwise be required to implement changes within a large and complex digital environment. The one or more commands can be updated or regenerated based on announcements by service providers (e.g., operating system developers), via analysis of new computing platforms 20, via publicly available documentation, etc. Similarly, the at least one automated command can also be updated without the number of resources that would otherwise be required to implement changes within a large and complex digital environment. The automated commands can be changed in response to changes in the target properties 24. In example embodiments, detected changes in a target property 24 as compared to a target property expected by the repository 218.

As indicated above, the platform 20 can be used to target the computing platform 10, or a device 12, etc.

In FIG. 2, an example configuration of the automation platform 20 is shown. In certain embodiments, the automation platform 20 may include one or more processors 202, a communications module 204, and a database interface module 206 for interfacing with the datastores of the enterprise system 16, or third party systems such as cloud providers. Communications module 204 enables the computing platform 20 to communicate with one or more other components of the computing environment 8, such as client device 12 (or one of its components), via a bus or other communication network, such as the communication network 14. The automation platform 20 includes at least one memory 216 or memory device that can include a tangible and non-transitory computer-readable medium having stored therein computer programs, sets of instructions, code, or data to be executed by processor 202. FIG. 2 illustrates examples of modules, tools and engines stored in memory on the automation platform 20 and operated by the processor 202. It can be appreciated that any of the modules, tools, and engines shown in FIG. 2 may also be hosted externally and be available to the automation platform 20, e.g., via the communications module 304. In the example embodiment shown in FIG. 2 the automation platform 20 includes an access control module 208, the automation module 210, the security (server) application 212, and an enterprise system interface module 214.

The automation platform 20 can also include a tool and/or command repository 218. The repository 318 can store the one or more commands to search the target platform 10, the automated commands (e.g., a plurality of automated commands to use), and related data or processes, such as the pre-configured parameters, the mapping between target properties 24 and the automated command to select, etc. In example embodiments, the automation platform 20 employs a machine learning module and recommendation engine (not shown) to enable the automation platform 20 to search the target platform 10, to determine the mapping between the target property 24 and the automated commands, and/or to generate automated commands itself. Such a recommendation engine may utilize or otherwise interface with a machine learning engine to both classify data currently being analyzed to generate a suggestion or recommendation, and to train classifiers using data that is continually being processed and accessed by the automation platform 20 and/or computing platform 10. The machine learning and recommendation engines can be packaged in a standalone tool to be inserted on the computing platform 10 by the platform 20 to perform evaluation and automation.

The automation module 210 can be used to implement the one or more commands to search the target platform 10, to implement one or more automated commands, to determine the mapping between the target property 24 and the automated commands, etc.

The access control module 208 may be used to apply a hierarchy of permission levels or otherwise apply predetermined criteria to determine what enterprise data, can be shared with which entity in the computing environment 8, and to determine which computing resources can be accessed by any platforms. For example, the automation platform 20 may have been granted access to certain sensitive data in the datastore 18a to generate commands, automated commands, and the mapping between target properties and the automated commands. In another example, the platform 10 can have been granted access to only certain servers or computing resource blocks of the enterprise system 16, and the access control module 208 can be used to share access logs and information to the automation platform 20 as indicative of a target property. The access control module 208 can be used to control the sharing of certain data of the enterprise system 16 or other datastore based on a type of client/user, a permission or preference, or any other restriction imposed by the computing environment 8 or application in which the automation platform 20 is used.

The automation platform 20 may also include or host the server-side security application 212 that enables client devices 12 to access, modify, or interact with the tool repository 218 (e.g., to update parameters, etc.). In example embodiments, the application 212 includes an application programming interface (API) to enable functionality of the platform 20 to be accessed via widely available software platforms, such as web browsers. The security application 212 may also interface with or be integrated into the enterprise system interface module 214 to permit a seamless integration with existing user interfaces and tools associated with the enterprise system 16.

The enterprise system interface module 214 can provide a graphical user interface (GUI) or API connectivity to communicate with the enterprise system 16 to access the platform 10, datastores (e.g., datastore 18, if applicable), for a certain user. It can be appreciated that the enterprise system interface module 314 may also provide a web browser-based interface, an application or "app" interface, a machine language interface, etc.

In FIG. 3, an example configuration of the enterprise system 16 is shown. The enterprise system 16 includes a communications module 302 that enables the enterprise system 16 to communicate with one or more other components of the computing environment 8, such as client device 12 (or one of its components) or computing platform 10, or the automation platform 20 (if remote to the system 16) via a bus or other communication network, such as the communication network 14. The enterprise system 16 includes at least one memory 310 or memory device that can include a tangible and non-transitory computer-readable medium having stored therein computer programs, sets of instructions, code, or data to be executed by one or more processors (not shown for clarity of illustration). FIG. 3 illustrates examples of servers and datastores/databases operable within the system 16. It can be appreciated that any of the components shown in FIG. 3 may also be hosted externally and be available to the system 16, e.g., via the communications module 302.

In the example embodiment shown in FIG. 3, the enterprise system 16 includes one or more servers to provide access to automation platform 20, datastores 18 of the enterprise system 16, etc. One or more servers enable the automation platform 20 to interface with existing components, services, departments, and lines of business implemented by the enterprise system 16. Exemplary servers utilized by the enterprise system 16 include a security application server 306, and a web application server 308. Although not shown in FIG. 3, as noted above, the enterprise system 16 may also include a cryptographic server for performing cryptographic operations and providing cryptographic services. The cryptographic server can also be configured to communicate and operate with a cryptographic infrastructure. The enterprise system 16 may also include one or more data storages for storing and providing data for use in such services, such as datastore 18a for storing sensitive.

Security application server 306 supports interactions with the platform 20 directly when a corresponding security application is installed on the client device 12 or platform 20. Security application server 306 can access other resources of the enterprise system 16 to carry out requests made by the corresponding security application, and to provide content and data to, the corresponding security application on the client device 12 or platform 20. In certain example embodiments, security application server 306 supports an employee mobile desktop, etc.

Web application server 308 supports interactions using a website accessed by a web browser application 420 (see FIG. 4) running on the client device 12. It can be appreciated that the security application server 306 and the web application server 308 can provide different front endpoints for the same application, that is, the mobile (app) and web (browser) versions of the same application of the platform 20. For example, the enterprise system 16 may provide an automation application for access by different employees (or related contractors) that be accessed via a client device 12 via a dedicated application, while also being accessible via a browser on any browser-enabled device.

In FIG. 4, an example configuration of the client device 12 is shown. In certain embodiments, the client device 12 may include one or more processors 402, a communications module 404, and a datastore(s) 406 for storing one or more of sensitive data, or data elements or applications that are used by, or are to be the subject of evaluation and automation by the platform 20. Communications module 404 enables the client device 12 to communicate with one or more other components of the computing environment 8, such as the computing platform 10, platform 20, or enterprise system 16, via a bus or other communication network, such as the communication network 14. The client device 12 can include at least one memory 408 or memory device that can include a tangible and non-transitory computer-readable medium having stored therein computer programs, sets of instructions, code, or data to be executed by processor 402. FIG. 4 illustrates examples of modules and applications stored in memory on the client device 12 and operated by the processor 402. It can be appreciated that any of the modules and applications shown in FIG. 4 may also be hosted externally and be available to the client device 12, e.g., via the communications module 404.

In the example embodiment shown in FIG. 4, the client device 12 includes a display module 414 for rendering GUIs and other visual outputs on a display device such as a display screen, and an input module 516 for processing user or other inputs received at the client device 12, e.g., via a touchscreen, input button, transceiver, microphone, keyboard, etc. The client device 12 may also include an enterprise application 418 provided by the enterprise system 16, e.g., for performing mobile insurance, banking, or other financial product or services. The client device 12 in this example embodiment also includes a web browser application 420 for accessing Internet-based content, e.g., via a mobile or traditional website. In this example, the client device 12 also includes a connections application 422, which corresponds to a client-based application to access and interface with the security application 212 hosted by the platform 20.

The datastore 406 may be used to store device data, such as, but not limited to, an IP address or a MAC address that uniquely identifies client device 12 within environment 8. The datastore 406 may also be used to store application data, such as, but not limited to, login credentials, user preferences, cryptographic data (e.g., cryptographic keys), etc.

It will be appreciated that only certain modules, applications, tools, and engines are shown in FIGS. 2 to 4 for ease of illustration and various other components would be provided and utilized by the platform 20, enterprise system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in platform 20 or enterprise system 16, or client device 12, or accessible or connectable thereto. Any application or module herein described may be implemented using computer readable/executable instructions that may be stored or otherwise held by such computer readable media.

Figure 5:
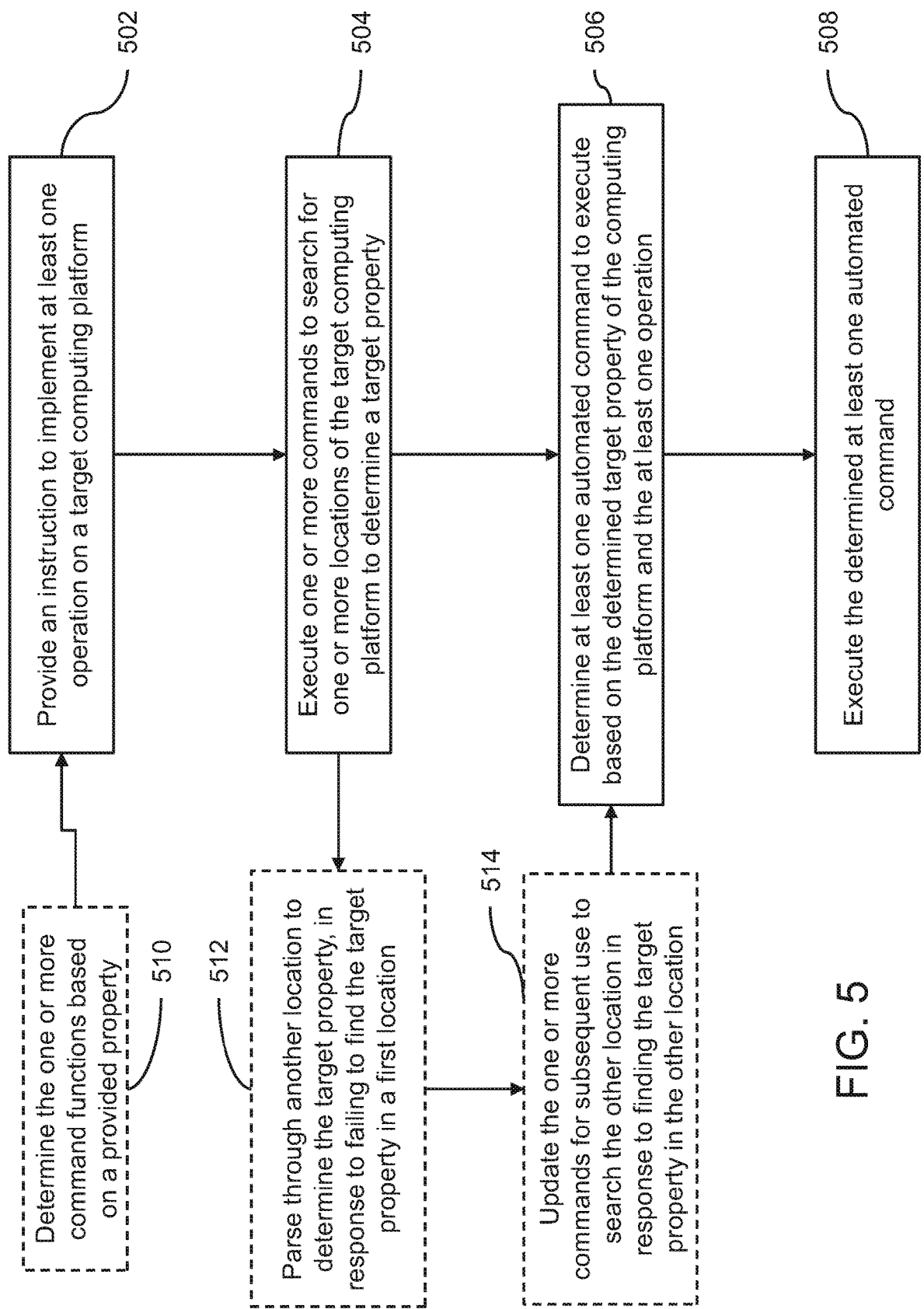
FIG. 5 is a flow diagram of an example of computer executable instructions for automating processes in digital systems.

Referring to FIG. 5, an example embodiment of computer executable instructions for processing hierarchical data is shown. Reference shall be made to the preceding figures in FIG. 5 for illustrative purposes, and any such reference is not intended to be limiting.

At block 502, an instruction to implement at least one operation on a target computing platform (e.g., platform 10) is provided. The instruction can be received via an interface generated by the display module 414.

At block 504, one or more commands are executed to search for one or more locations of the target computing platform to determine a target property (e.g., property 24). The one or more locations can be determined in accordance with the at least one pre-configured parameter, which can include an expected nomenclature of directories of the operating system to find its binary file, an expected naming convention of the binary file itself, etc. That is, the one or more locations being searched can be confined by the at least one pre-configured parameter.

At block 506, at least one automated command to execute based on the determined target property of the computing platform and the at least one operation is determined. For example, the automated command can be a command to install a logging application, wherein the operation is a request to configure a new platform 10. In another example, the operation can be a request to perform a security audit, and the at least one automated command can include installing a security auditing application, executing the application on the platform 10, and reporting the results of the executed application.

The at least one automated action includes corrective actions. For example, the corrective actions can include quarantining data file(s), deleting certain files in response to a failed audit, quarantining the computing platform 10, switching deployment workflows to an alternative redundant platform 10, etc.

At block 508, the determined at least one automated command is executed.

Optionally, at shown block 510, the platform 20 can be provided with a property of the target computing platform 10, which can reduce the need to attempt different commands to determine the target property. For example, the platform 20 can be provided with a property that the target platform is expected to implement Unix, and commands responsive to Windows are therefore not implemented.

Optional, as shown in blocks 512 and 514, the platform 20 can be configured to systematically search a computing platform 10 for the target property. For example, the platform 20 can be configured to first search for a particular directory name, then search for files within the directory name, and different drives or other locations of the platform 10 can be searched. For example, at block 512, the platform 20 can search through a first location for a target property, fail that search, and thereafter search another location of the platform 10 for the target property.

The platform 20 can iteratively perform the searches in different locations until the target property 24 is found. The platform 20 can cycle through commands in different locations, or cycle through different commands at the same location, etc.

At block 514, the platform 20 can be updated to use the commands (e.g., which commands are used, the sequence of commands used, etc.) that were successful in block 512. The commands are updated for subsequent use to search the other location in response to finding the target property in the other location.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified. In a particular example, block 512 can be completed and lead to block 506, with block 514 occurring afterwards.

Although the above principles have been described with reference to certain specific examples, various modifications thereof will be apparent to those skilled in the art as outlined in the appended claims.

The invention claimed is:

1. A device for automating processes in digital environments, the device comprising:
    a processor;
    and
    a memory coupled to the processor, the memory storing computer executable instructions that when executed by the processor cause the device to:
        provide an instruction to implement at least one operation on a target computing platform;
        execute one or more commands to search one or more locations of the target computing platform to determine a target property that impacts implementation of at least one automated command on the target computing platform, the one or more commands searching based on at least one pre-configured parameter of a plurality of pre-configured parameters for searching computing platforms;
        determine the at least one automated command to execute based on the determined target property and the at least one operation, the at least one automated command being selected from a repository of automated commands for detecting anomalies in digital environments; and
        execute the at least one automated command to detect anomalies in the target computing platform.

2. The device of claim 1, wherein the at least one pre-configured parameter is an expected binary property of either a device associated with the target computing platform or a virtually instantiated platform.

3. The device of claim 2, wherein the expected binary property is a name of a binary.

4. The device of claim 3, wherein the expected binary property is updated in response to the one or more commands finding a name in an expected location that satisfies a threshold of similarity to the name.

5. The device of claim 1, wherein the plurality of pre-configured parameters for searching computing platforms comprise parameters of naming conventions associated with different computing platforms.

6. The device of claim 1, wherein the instructions cause the device to:
    execute another of the one or more commands to perform another search with another of the at least one pre-configured parameters in response to the search being unsuccessful.

7. The device of claim 1, wherein the target property is an ability of a computing platform to implement the at least one automated command as defined by a configuration file associated with a binary file.

8. The device of claim 1, wherein the instructions further cause the device to determine the one or more commands based on a provided property.

9. The device of claim 1, wherein the one or more locations comprise a plurality of locations, and wherein the instructions further cause the device to, in response to failing to find the target property in one location of the plurality of locations, search through another location of the plurality of locations to determine the target property.

10. The device of claim 9, wherein the one or more commands are updated for subsequent use to search the other location in response to finding the target property in the other location.

11. The device of claim 1, wherein the at least one automated command is generated using machine learning.

12. A method for automating processes in digital environments, the method comprising:
    providing an instruction to implement at least one operation on a target computing platform;
    executing one or more commands to search one or more locations of the target computing platform to determine a target property that impacts implementation of at least one automated command on the target computing platform, the one or more commands searching based on at least one pre-configured parameter of a plurality of pre-configured parameters for searching computing platforms;
    determining the at least one automated command to execute based on the determined target property and the at least one operation, the at least one automated command being selected from a repository of automated commands for detecting anomalies in digital environments; and
    executing the at least one automated command to detect anomalies in the target computing platform.

13. The method of claim 12, wherein the at least one pre-configured parameter is an expected binary property of either a device associated with the target computing platform or a virtually instantiated platform.

14. The method of claim 13, wherein the expected binary property is a name of a binary.

15. The method of claim 14, wherein the expected binary property is updated in response to the one or more commands finding a name in an expected location that satisfies a threshold of similarity to the name.

16. The method of claim 12, the method comprising executing another of the one or more commands to perform another search with another of the at least one pre-configured parameters in response to the search being unsuccessful.

17. The method of claim 12, the method comprising determining the one or more command functions based on a provided property.

18. The method of claim 12, wherein the one or more locations comprise a plurality of locations, the method comprising, in response to failing to find the target property in one location of the plurality of locations, searching through another location of the plurality of locations to determine the target property.

19. The method of claim 12, wherein the at least one automated command is generated using machine learning.

20. A non-transitory computer readable medium for automating processes in digital environments, the computer readable medium comprising computer executable instructions for:
    providing an instruction to implement at least one operation on a target computing platform;
    executing one or more commands to search one or more locations of the target computing platform to determine a target property that impacts implementation of at least one automated command on the target computing platform, the one or more commands searching based on at least one pre-configured parameter of a plurality of pre-configured parameters for searching computing platforms;

determining the at least one automated command to execute based on the determined target property and the at least one operation, the at least one automated command being selected from a repository of automated commands for detecting anomalies in digital environments; and executing the at least one automated command to detect anomalies in the target computing platform.

* * * * *